United States Patent
Hannah et al.

(10) Patent No.: US 7,146,008 B1
(45) Date of Patent: Dec. 5, 2006

(54) CONDITIONAL ACCESS TELEVISION SOUND

(75) Inventors: Eric C. Hannah, Pebble Beach, CA (US); Benjamin M. Cahill, III, Ringoes, NJ (US)

(73) Assignee: Intel California, Santa Clara, CA (US)

( * ) Notice: Subject to any disclaimer, the term of this patent is extended or adjusted under 35 U.S.C. 154(b) by 859 days.

(21) Appl. No.: 09/595,804

(22) Filed: Jun. 16, 2000

(51) Int. Cl.
*H04N 7/167* (2006.01)
*H04N 9/45* (2006.01)

(52) U.S. Cl. ............ 380/236; 280/208; 280/209; 280/210; 280/238; 725/31; 725/32; 348/423.1; 348/436

(58) Field of Classification Search ........ 380/236, 380/238, 208, 209, 210; 348/423.1, 433.1, 348/436.1; 725/31, 32
See application file for complete search history.

(56) References Cited

U.S. PATENT DOCUMENTS

| | | | | |
|---|---|---|---|---|
| 3,885,089 A | * | 5/1975 | Callais et al. ........... 380/220 |
| 4,081,832 A | * | 3/1978 | Sherman ................. 380/230 |
| 4,215,366 A | * | 7/1980 | Davidson ............... 380/235 |
| 4,318,125 A | * | 3/1982 | Shutterly .............. 380/236 |
| 4,964,162 A | * | 10/1990 | McAdam et al. ......... 380/215 |
| 5,228,082 A | * | 7/1993 | Yanagidaira et al. ...... 380/209 |
| 5,355,410 A | * | 10/1994 | Blais et al. ............ 380/209 |
| 5,371,548 A | * | 12/1994 | Williams ............... 348/478 |
| 5,416,801 A | * | 5/1995 | Chouly et al. .......... 375/260 |
| 5,621,792 A | * | 4/1997 | Charton et al. ......... 380/209 |
| 5,732,113 A | * | 3/1998 | Schmidl et al. ......... 375/355 |

\* cited by examiner

*Primary Examiner*—Taghi T. Arani
(74) *Attorney, Agent, or Firm*—Trop, Pruner & Hu, P.C.

(57) ABSTRACT

A digitally encrypted audio signal may be transmitted with an analog television signal. Access to the analog television video signal may be controlled by using graphics overlay techniques. The use of digital encryption techniques on the audio channel prevents improper interception.

25 Claims, 4 Drawing Sheets

CONDITIONAL ACCESS TELEVISION SOUND

BACKGROUND

This invention relates generally to systems for conditional access to television programming.

In a conditional access television system, access to the television programming is limited to certain viewers who pay to receive the programming. In some cases, the audio and video portions of the broadcast are digitally encrypted at the broadcast head end and decrypted at the receiver end.

In other cases, analog broadcast systems may be utilized. In analog systems, a graphics overlay may be provided at the head end over the analog television programming to make it difficult for one to watch the programming. Conventionally, the overlay provides distortions and horizontal lines that disrupt the picture so that very little content can be discerned.

Analog conditional access television systems generally do not distort the audio. In some cases, the audio may have considerable value. Thus, it would be desirable to also distort the accompanying audio information so that only authorized receivers may enjoy the audio.

Human perception of sound is much more precise than human visual perception. Artifacts at an acceptable level for the video portion of an analog transmission may be far too large for the audio portion. Moreover, analog television provides an audio channel as a frequency modulated (FM) subcarrier with only 0.75 MHz bandwidth.

There are numerous sources of noise and distortion in television broadcasts. These imperfections may disrupt the clean decoding of the audio signal. The most serious artifact is ghosting or multi-path transmission. Ghosting results at the receiver when the primary, first arriving signal is then followed by several delayed, weaker signals. These weaker signals may have been reflected off of intervening obstructions such as buildings, mountains or other structures. The primary, first arriving signal and the weaker signals sum together at the radio frequency input to the television decoder.

Each time a ghost signal is added to the television signal mix, the implicit value of an encoded signal bit is changed. Thus, naïve decoding of the audio signal produces large artifacts due to the ghost signals.

Even in cable distribution systems, improper signal splitters, bad cable terminations and other defects produce echoes that have the same effect as multi-path transmission over the air. As a result, these types of distortions may be prevalent in both wireless and wired transmissions.

Thus, there is a need for better ways to provide an analog conditional access television system that adequately protects the audio portion of the television transmission.

DETAILED DESCRIPTION

Figure 1:
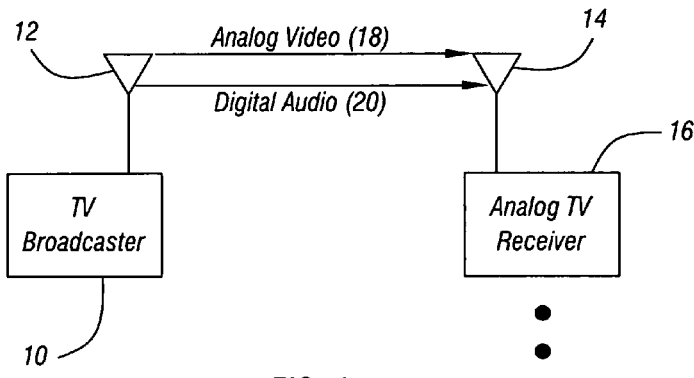
FIG. 1 is a schematic depiction of one embodiment of the present invention.

Referring to FIG. 1, a conditional access analog television broadcast transmitter (e.g., TV broadcaster) 10 may transmit, from an antenna 12, subcarriers modulated by analog video information 18 and digital audio information 20. The analog video information 18 may be in a format conventionally used for wired or wireless television broadcasts. An example of a wireless television broadcast is an airwave broadcast and an example of a wired broadcast is a cable system television broadcast.

In accordance with one embodiment of the present invention, the audio information 20 is digitally encoded, compressed and then broadcast on a subcarrier with the analog video information 18 broadcast on an accompanying subcarrier. The transmitted television information (audio and video) may be received by antennas or other video input devices 14 associated with conditional access television receivers (e.g., analog TV receiver) 16. A large number of television receivers 16 may be coupled to the audio/video transmission through a conventional antennas or through cable distribution system.

Figure 2:
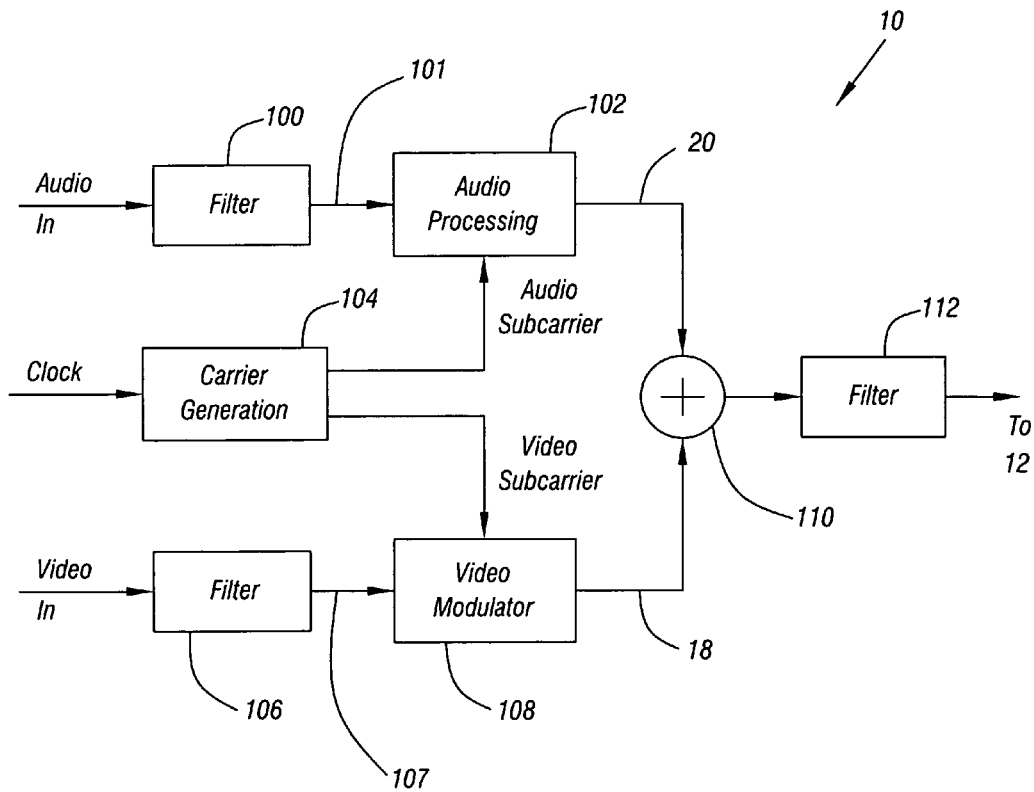
FIG. 2 is a block diagram showing the transmitter 10 in accordance with one embodiment of the present invention.

Referring to FIG. 2, the signal processing of the transmitter 10 begins by receiving an audio input signal, a video input signal and a clock input signal. The clock signal is utilized to generate an audio subcarrier and a video subcarrier in the carrier generation block 104. The audio input signal is filtered at filter block 100 and then processed in audio processing block 102.

At the same time, the video input signal is filtered in the filter block 106 and modulated in the video modulator block 108 using the video subcarrier to produce an analog video signal 18. The analog video signal 18 and the digital audio signal 20 are added together in an adder 110. After the signals are filtered at the filter block 112, they may be broadcast from the antenna 12.

Figure 3:
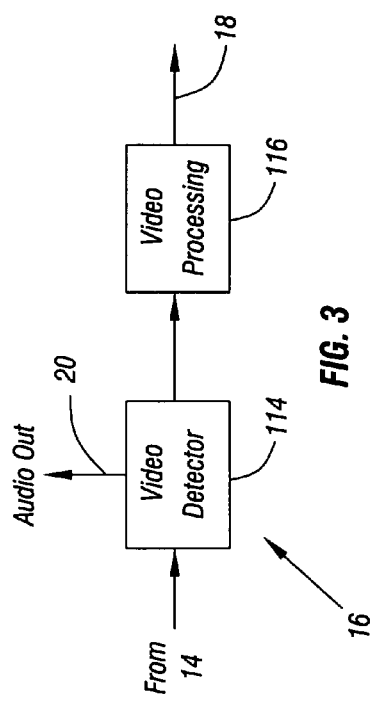
FIG. 3 is a block diagram of the signal processing section of a receiver in accordance with one embodiment of the present invention.

On the receiver 16 end, the signal from the antenna or other video source 14 is subjected to video detection in the video detector block 114 in FIG. 3. The video detector 114 separates the audio signal 20 from the video signal 18. The video signal is subject to further video processing in the video processing block 116.

Figure 4:
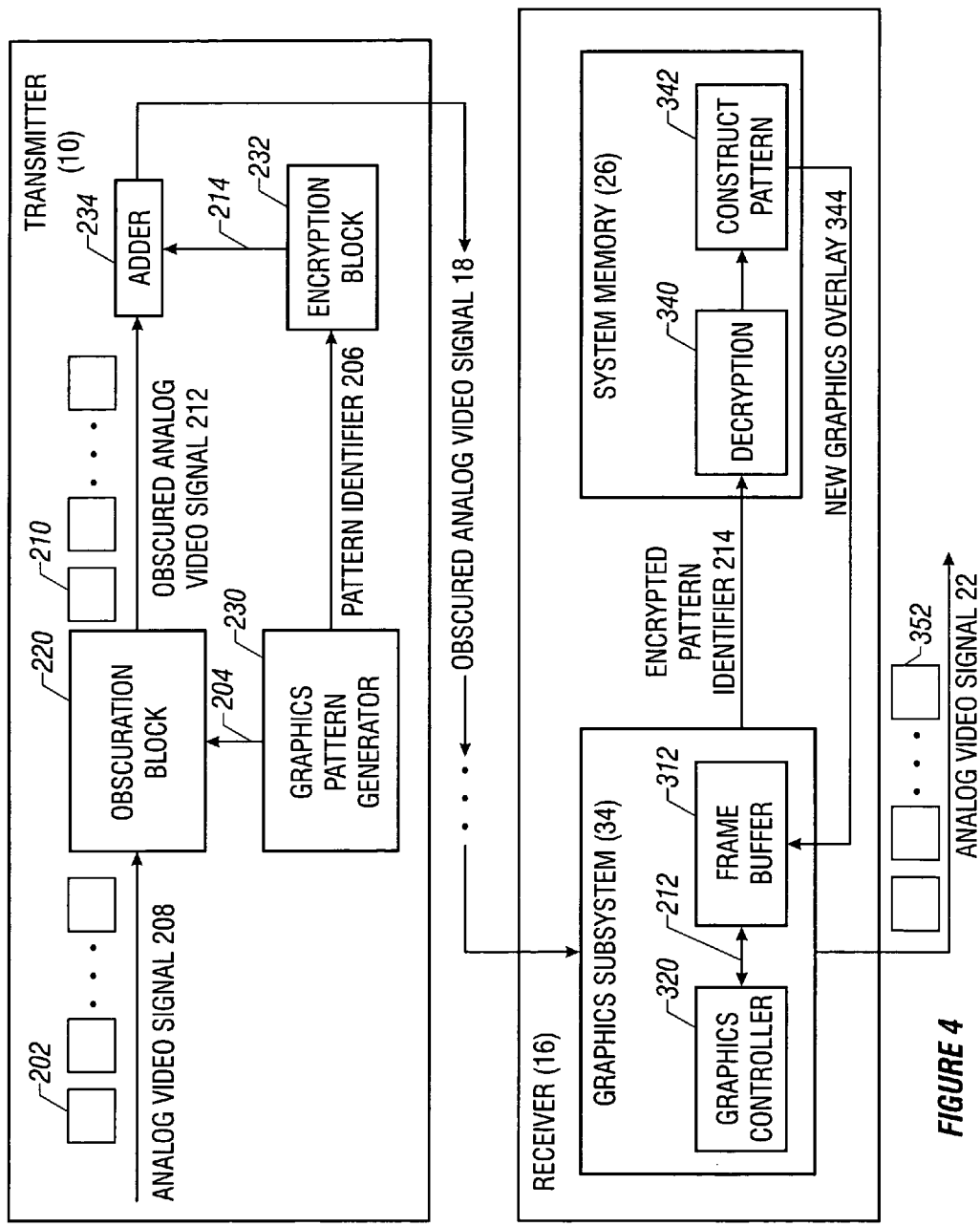
FIG. 4 is a block depiction of the video portion of the receiver and transmitter shown in FIG. 1 in one embodiment of the present invention.

A variety of techniques may be used to obscure the analog video signal 18 to prevent interception and viewing by unauthorized persons. In one embodiment, shown in FIG. 4, the video frames 202 to be broadcast by the transmitter 10 are received by an obscuration block 220. The block 220 further receives a graphics pattern 204 from a graphics pattern generator 230. The block 220 adds the graphics pattern 204 to the frame 202, to produce an obscured frame 210. A plurality of obscured frames 210 may comprise an obscured analog video signal 212.

The graphics pattern generator 230 further produces a pattern identifier 206, to be received by an encryption block 232. In one embodiment, a new pattern identifier is created for each graphics overlay pattern that is generated inside the transmitter 10. The encryption block 232 encrypts the pattern identifier 206, to produce an encrypted pattern identifier 214.

Encrypted pattern identifier 214 may then be transmitted with the obscured analog video signal 212. Accordingly, adder 234 combines the signals 212 and 214 to produce an obscured analog video signal 18 that includes encrypted pattern information. In one embodiment of the present invention, the encrypted pattern identifier 214 is transmitted on the vertical blanking interval (VBI) of the obscured analog video signal 18.

The receiver 16 includes a graphics subsystem 34 with a graphics controller 320 and a frame buffer 312. The graphics subsystem 34 may receive the obscured analog video signal 18 from the transmitter 10. The graphics controller 320 sends each frame of the analog video signal 18 to a frame buffer 312. The graphics controller 320 extracts the encrypted pattern identifier 214 from the incoming signal 18 and sends the signal to a system memory 26.

In system memory 26, decryption 340, followed by a pattern construction (e.g., construct pattern block) 342, are performed on the pattern identifier 214, in one embodiment of the invention. These operations produce a new graphics overlay pattern 344, to be added to the obscured video frame 18 in the frame buffer 312. An unobscured analog video signal 22 may then be sent to a display such as a television set (not shown).

Each graphics pattern 204 may be associated with a pattern identifier 206. The pattern identifier 206 may be used by one or more receivers 16 to recover as much as the original signal 208 as possible.

Each frame 202 is coupled with a graphics pattern 204 to produce an obscured frame 210. The pattern identifier 206 associated with the graphics pattern 204 is added to the obscured frame 210, to produce an obscured and encoded signal 18, prior to transmission. The transmitter 10 may then send the obscured signal 18 to a receiver 16. Without removing the obscuration from the signal 18, an interceptor of the signal can only view an image that is confusing and frustrating.

In the receiver 16, obscuration removal software directs the graphics controller 320 to send the video frame 210 to the frame buffer 312 and the encrypted pattern identifier 214 to the system memory 26. The obscuration removal software encrypts the pattern identifier 214 residing in the system memory 26. From the decrypted pattern identifier, the software may further construct a graphics pattern that is complementary to the graphics pattern 204 created at the transmitter 10.

The obscuration removal software may direct the graphics controller 320 to add the complementary graphics pattern to the frames in the frame buffer 312. A combination of the complementary graphics pattern and the contents of the frame buffer 312 substantially removes the obscuration from the analog video signal 18.

Figure 5:
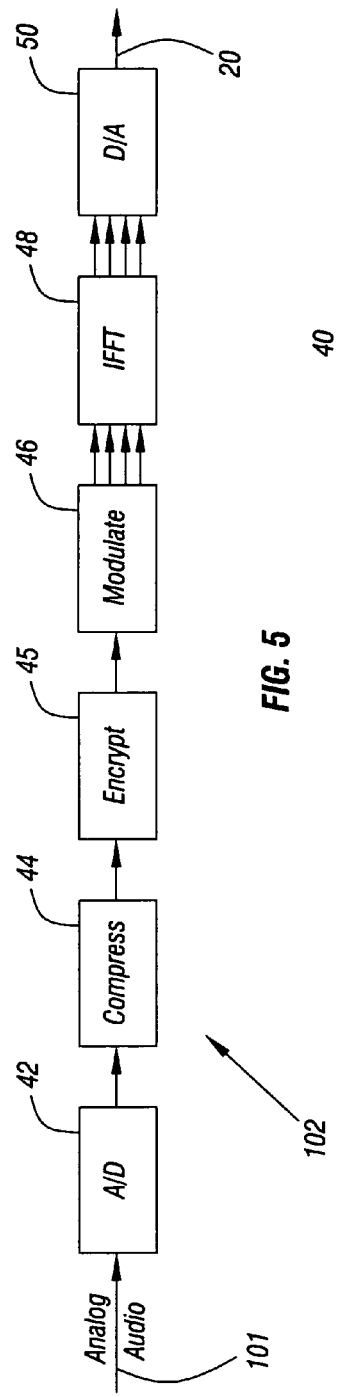
FIG. 5 is a schematic depiction of a portion of the transmitter in accordance with one embodiment of the present invention.

Referring to FIG. 5, the broadcast transmitter 10 generates a digital audio signal 20 from an analog audio signal received by analog to digital converter 42. The converter 42 converts the audio signal into a digital form so it can be compressed in a compressor shown as the compress block 44. Any of a wide variety of compression techniques may be utilized including those in accordance with The Motion Picture Experts Group compression standards MPEG-1, layer 3, International Organization for Standardisation (Geneva Switzerland) ISO/IEC 11172-3 (1993) (commonly called "MP3"). In one embodiment of the present invention, a bit stream of a 100 Kbits per second may result.

The compressed audio stream may be compressed sufficiently to be useful with the bandwidth available for the audio component of the television broadcast. The compressed audio stream may be encrypted in an encryption unit shown as the encrypt block 45. Any conventional digital encryption technique may be utilized.

Next, the encrypted, compressed bit stream is modulated in a modulator shown as the modulate block 46. The modulator 46 modulates the frequency-modulated subcarrier produced by the television transmitter 10. The modulator 46 may also band limit the signal to avoid interference between the video and audio components. A band limited digital audio signal results that may only be perceived, if intercepted, as white noise.

Likewise, a video signal modulator (not shown) may band limit the video signal for the same reason. The analog video signal 18 may be modulated using conventional analog amplitude modulation techniques on the video carrier and transmitted with the audio signal 20 modulated onto the audio subcarrier.

The modulated audio signal may be converted into a plurality of frequency division subchannels. In FIG. 5, four such subchannels are shown for illustration purposes. Each of the subchannels is then subjected to an inverse fast Fourier transform (IFFT) in the unit 48 to implement Orthogonal Frequency Division Multiplexing in one embodiment.

Orthogonal Frequency Division Multiplexing (OFDM) is a multi-carrier transmission technique. It separates the available spectrum into many subcarriers. Each subcarrier may be modulated by a low rate data stream. OFDM may use the spectrum efficiently by spacing the channels more closely than is possible with other techniques. This may be achieved by making all the subcarriers orthogonal to one another, preventing interference between the closely spaced subcarriers.

Conventionally, the minimum required bandwidth for speech is only three kilohertz. The allocated bandwidth in practical systems may be greater than the minimum to prevent subchannels from interfering with one another. The resulting added bandwidth enables signals from neighboring channels to be filtered out and allows for drift in the center frequency of the transmitter and receiver. As much as fifty percent of the total spectrum may be wasted through the use of extra spacing between channels.

OFDM splits the available bandwidth into many narrow channels (for example from one hundred to eight thousand). The subcarriers for each channel are made orthogonal to one another. As a result, they may be spaced very closely together. The orthogonality of the carriers means that each carrier has an integer number of cycles over a symbol period. As a result, the spectrum of each carrier has a null at the center frequency of each of the other subcarriers. This reduces the interference between subcarriers, allowing them to be spaced closely together.

Each subcarrier in an OFDM signal has a very narrow bandwidth resulting in a low symbol rate. This results in a signal having a high tolerance to multi-path transmissions. The delay spread from multi-path transmissions must be very long to cause significant signal interference in a properly designed OFDM system.

The OFDM signal is generated by first choosing the spectrum required, based on the input data and the modulation scheme. Each subcarrier is assigned some data to transmit. The required amplitude and phase of the subcarrier is then calculated based on the modulation scheme. Typical modulation schemes include differential Binary Phase Shift Keying (BPSK), Quadrature Phase Shift Keying (QPSK) or Quadrature Amplitude Modulation (QAM). The needed spectrum is then converted back to the time domain using an inverse Fourier transform, such as an inverse fast Fourier transform (IFFT).

A fast Fourier transform transforms a cyclic time domain signal into its equivalent in the frequency domain. This may be done by finding the equivalent waveform, generated by the sum of orthogonal sinusoidal components. The amplitude and phase of the components represent the frequency spectrum of the time domain signal. The IFFT unit 48 performs the reverse process, transforming the amplitude and phase of each component into a time domain signal. Each data point in the frequency spectrum used for an FFT or an IFFT is called a bin.

The orthogonal carrier used in the OFDM signal can be easily generated by setting the amplitude and phase of each bin and then performing the IFFT. Since each bin of an IFFT corresponds to the amplitude and phase of a set of orthogonal sinusoidal signals, a reverse process guarantees that the carriers generated are orthogonal.

The inverse Fourier fast transform signal is then converted from a parallel to a serial format and from a digital to an analog format, in the digital to analog converter 50, resulting in a digital audio signal 20. The signal 20 is broadcast by the transmitter 10 shown in FIG. 4 on a subcarrier.

Figure 6:
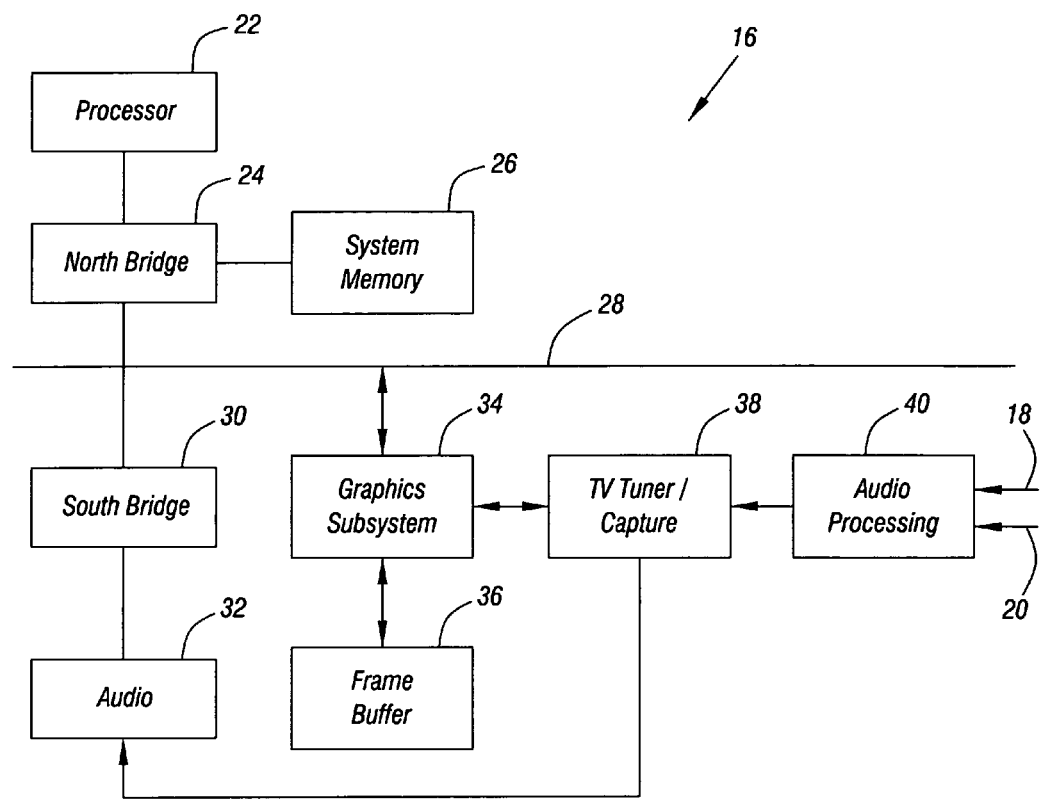
FIG. 6 is a block diagram of a receiver in accordance with one embodiment of the present invention.

Referring to FIG. 6, the receiver 16 may include a processor 22 coupled to a north bridge 24 in one embodiment. The north bridge 24 is coupled between a bus 28 and system memory 26. The bus 28 couples a south bridge 30 and a graphics subsystem 34. The graphics subsystem 34 includes a frame buffer 36.

The graphics subsystem 34 is coupled to a TV tuner/capture card 38. The card 38 is coupled to an audio processing section 40 which receives both the audio 20 and video signals 18 from an antenna or other video input device 14 shown in FIG. 1. The TV tuner/capture card 38 is also coupled to e.g., an audio block 32, such as an audio coder/decoder (CODEC) which is in turn coupled to the south bridge 30.

Figure 7:
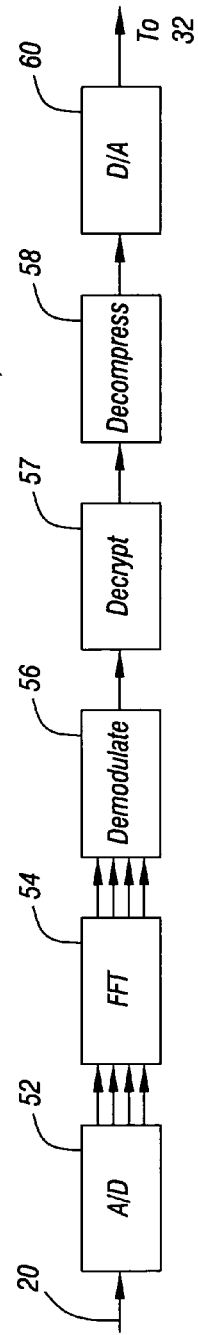
FIG. 7 is a block diagram of the audio processing block shown in FIG. 6 in accordance with one embodiment of the present invention.

Turning next to FIG. 7, the audio processing section 40 takes the audio signal 20 and converts it into a digital form in analog to digital converter 52. The converter 52 also takes the serial bit stream and converts it into a set of parallel bit streams. The parallel bit streams are fast Fourier transformed in the FFT 54 and passed on to a demodulator such as the demodulate block 56.

The demodulator 56 reverses the modulation previously accomplished by the modulator 46. The demodulated serial bit stream signal is then decrypted in the decrypt unit 57 and decompressed in the decompress unit 58. Finally, the audio signal is converted back into an analog form by a digital-to-analog converter 60 and added to the video signal 22 shown in FIG. 4 by an adder. The resulting signal is passed on to the TV tuner/capture card 38.

In high data rate communications, if the symbol period becomes smaller than the delay spread of the channel, inter-symbol interference (ISI) occurs. In multi-carrier systems, a number of data symbols are transmitted as different subcarriers in parallel, thereby increasing the symbol length. To increase the bandwidth efficiency, an orthogonal multi-carrier scheme is used in which the sub-bands are overlapping. Each sub-band only covers a smaller part of the total available frequency band. As a result, channel equalization becomes much simpler than in a single carrier system.

Figure 8:
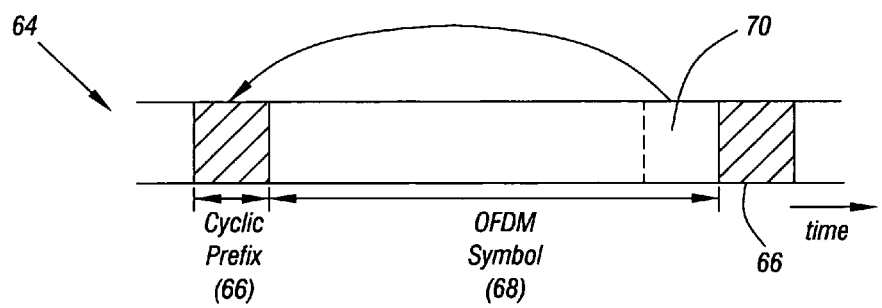
FIG. 8 schematically depicts a technique for providing a guard interval in accordance with one embodiment of the present invention.

To reduce the inter-symbol interference, the tail of the OFDM symbol may be copied and used as a preamble. In effect, the tail serves as a cyclically extended guard interval that may be called a cyclic prefix. Referring to FIG. 8, the symbol 68 may be bordered by a cyclic prefix 66. The cyclic prefix 66 may be formed by taking a portion of the symbol 68 and using it to form the cyclic prefix. The use of the cyclic prefix as a guard interval may simplify the channel equalization and the demodulation. It also may maintain carrier synchronization in the receiver.

In general, the guard interval allows time for multi-path signals from a previous signal to die away before the information from the current signal is gathered. Thus, the end of the symbol waveform may be placed at the start of the symbol as a guard interval, in one embodiment of the invention. This effectively extends the length of the symbol while maintaining the orthogonality of the waveform.

In a first embodiment of the present invention, an analog audio signal may be generated that can directly modulate the conventional FM subcarrier of a television transmitter 10. The synthesized analog signal is limited to fifteen kilohertz of bandwidth. In a second embodiment, a waveform may be directly synthesized to replace the normal frequency modulated subcarrier. Then 0.75 megahertz of bandwidth is available.

For regional broadcasting, one may assume a reflection time of two hundred and fifty microseconds. A guard interval 66 time equal to the worst case multi-path delay time may be set at two hundred and fifty microseconds, for example. The guard interval 66 may be less than about one quarter of the symbol 68 duration. Thus, a one-millisecond symbol 68 time gives ample time for the echoes to die out allowing an accurate determination of the transmitted symbol 68.

To allow a large amount of data to be transmitted, the subcarriers are closely spaced to each other's frequency. The optimal frequency spacing is one over the period of the symbol 68, which equals one kilohertz in one embodiment.

Thus, in the first embodiment, which uses a conventional FM audio subcarrier, about fifteen carriers may be utilized with an aggregate baud rate of fifteen kilobaud. The baud rate combined with the need to transmit data at one hundred kilobits per second determines that each signal carries about six bits of information.

In the second embodiment, seven hundred and fifty carriers may be utilized at a rate of seven hundred and fifty kilobaud. Very simple binary keying with each symbol carrying one bit of information may be used. There are well-developed techniques for producing multi-level, multi-bit symbols.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of broadcasting video programming comprising:
    generating an analog video signal with a graphical overlay pattern;
    digitally encrypting an audio signal to provide a digitally encrypted audio signal;
    modulating a carrier with said digitally encrypted audio signal and said analog video signal; and broadcasting said audio and video signals, wherein said digitally encrypted audio signal is broadcast using a plurality of overlapping subcarriers and the video signal is broadcast using an accompanying subcarrier.

2. The method of claim 1 wherein modulating a carrier with said digitally encrypted audio signal includes using orthogonal frequency division multiplexing to form symbols.

3. The method of claim 2 including using an inverse Fourier transform to convert a frequency domain signal back to the time domain.

4. The method of claim 3 including providing a guard interval with an orthogonal frequency division multiplexing symbol.

5. The method of claim 4 including providing said guard interval as a cyclic prefix.

6. The method of claim 5, wherein said cyclic prefix comprises a portion of a transmitted symbol.

7. The method of claim 6, wherein said portion comprises a tail of said transmitted symbol.

8. The method of claim 1, further comprising encrypting a pattern identifier associated with the graphical overlay pattern and broadcasting the encrypted pattern identifier with the audio and video signals.

9. The method of claim 8, further comprising broadcasting the encrypted pattern identifier in a video blanking interval of the broadcast video signal.

10. A television-transmitter comprising:
a graphics pattern generator to provide a graphics pattern to add to a frame of an analog video signal to form an obscured video signal;
an analog-to-digital converter to receive an analog audio signal;
a digital encryption stage coupled to said analog-to-digital converter to generate a digital audio signal;
a modulator coupled to said digital encryption stage to generate a modulated audio signal; and
a broadcaster to transmit the obscured video signal and the modulated audio signal using a plurality of overlapping subcarriers.

11. The transmitter of claim 10 wherein said modulator is adapted to use orthogonal frequency division multiplexing.

12. The transmitter of claim 11 further including an inverse Fourier transform unit coupled to said modulator.

13. The transmitter of claim 12 including a digital-to-analog converter coupled to said inverse Fourier transform unit.

14. The transmitter of claim 10, wherein the modulator is adapted to insert a cyclic prefix onto symbols of said modulated audio signal.

15. The transmitter of claim 14, wherein said cyclic prefix comprises a portion of said symbols.

16. The television transmitter of claim 10, wherein the modulator is to band limit the modulated audio signal.

17. A television receiver comprising:
a video detector to separate a received television signal into audio and video component;
a device coupled to said video detector to remove a graphics overlay added to a frame of an analog video signal obtained from the received television signal to output an analog video signal;
an analog-to-digital converter coupled to convert an audio signal obtained from the received television signal into a digital audio bit stream;
a decryption stage coupled to said analog-to-digital converter;
a demodulator coupled to said decryption stage to demodulate the digital audio bit stream;
a converter to convert the demodulated digital audio bit stream into an analog audio signal; and
a combiner to combine the analog video signal and the analog audio signal and to output a combined signal.

18. The receiver of claim 17 wherein said demodulator is adapted to demodulate via orthogonal frequency division multiplexing.

19. The receiver of claim 17 further including a Fourier transform unit coupled to said demodulator.

20. The receiver of claim 19 wherein the analog-to-digital converter is to provide a plurality of parallel digital audio bit streams to said Fourier transform unit.

21. The receiver of claim 17, wherein the demodulator is to demodulate the digital audio bit stream using a cyclic prefix as a guard interval.

22. The receiver of claim 21, wherein said guard interval comprises a portion of received symbol.

23. The receiver of claim 17, further comprising a frame buffer coupled to the video detector to store the frame of the analog video signal.

24. The receiver of claim 17, further comprising a software routine to receive a pattern identifier associated with the graphics overlay and to generate a complementary graphics overlay based on the pattern identifier.

25. The receiver of claim 24, wherein the software routine is to add the complementary graphics overlay to the frame of the analog video signal.

* * * * *